US008874914B2

(12) United States Patent
Stauth et al.

(10) Patent No.: US 8,874,914 B2
(45) Date of Patent: Oct. 28, 2014

(54) SECURE AND AUTOMATED CREDENTIAL INFORMATION TRANSFER MECHANISM

(75) Inventors: Sean Alexander Stauth, San Francisco, CA (US); Sewook Wee, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 1045 days.

(21) Appl. No.: 12/701,455

(22) Filed: Feb. 5, 2010

(65) Prior Publication Data

US 2011/0197065 A1    Aug. 11, 2011

(51) Int. Cl.
*H04L 9/32*     (2006.01)
*H04L 29/06*    (2006.01)
*G06F 9/455*    (2006.01)

(52) U.S. Cl.
CPC ...... *H04L 63/08* (2013.01); *G06F 2009/45562* (2013.01); *H04L 63/0838* (2013.01); *H04L 63/062* (2013.01); *G06F 2009/45587* (2013.01); *G06F 9/45558* (2013.01)
USPC ........................................................ 713/170

(58) Field of Classification Search
CPC ....... H04L 63/00; H04L 63/06; H04L 63/067; H04L 63/08; H04L 63/0838; H04L 63/0876; H04L 9/08; H04L 9/0816; H04L 9/0819; H04L 9/088; H04L 9/32; H04L 9/3226; H04L 9/3228; G06F 21/30; G06F 21/44; G06F 9/445; G06F 9/455
USPC ......... 713/1–2, 150, 155–156, 168, 170–171; 726/2–7, 26–27, 29; 380/277–279, 380/286; 718/1; 709/208, 220, 222
See application file for complete search history.

(56) References Cited

U.S. PATENT DOCUMENTS

| 7,275,260 | B2 * | 9/2007 | de Jong et al. ................. 726/10 |
| 7,310,684 | B2 * | 12/2007 | Patrick et al. ................. 709/238 |
| 7,412,518 | B1 * | 8/2008 | Duigou et al. ................. 709/227 |
| 7,725,723 | B2 * | 5/2010 | Landrock et al. ............. 713/176 |
| 7,793,101 | B2 * | 9/2010 | Wipfel et al. ................. 713/168 |
| 7,953,974 | B2 * | 5/2011 | Yamamura et al. ........... 713/168 |
| 8,108,912 | B2 * | 1/2012 | Ferris ............................. 726/3 |
| 8,336,047 | B2 * | 12/2012 | Van Hensbergen ........... 718/1 |
| 2003/0014638 | A1 * | 1/2003 | Lincoln et al. ................ 713/178 |
| 2005/0132182 | A1 * | 6/2005 | Challener et al. ............. 713/150 |
| 2005/0228981 | A1 * | 10/2005 | Gavrilov et al. ............. 713/100 |
| 2005/0289644 | A1 * | 12/2005 | Wray ............................. 726/5 |
| 2007/0088762 | A1 * | 4/2007 | Harris et al. ................. 707/201 |
| 2007/0250833 | A1 | 10/2007 | Araujo et al. |

(Continued)

OTHER PUBLICATIONS

European Patent Office Extended European Search Report for Application No. 11153424.4-1853 dated Jul. 24, 2014, 6 pages.

*Primary Examiner* — Michael Chao
*Assistant Examiner* — Eric W Shepperd
(74) *Attorney, Agent, or Firm* — Fish & Richardson P.C.

(57) ABSTRACT

A mechanism for securely transmitting credentials to instantiated virtual machines is provided. A central server is used to turn on a virtual machine. When the virtual machine is turned on, the central server sends it a secret text string. The virtual machine requests the credentials from the central server by transmitting the secret string and its instance ID. The central server validates the secret string and source IP to determine whether they are authentic. Once verified, the central server transmits the credentials to the virtual machine in a secure channel and invalidates the secret string. The credentials can now be used to authenticate API calls.

24 Claims, 4 Drawing Sheets

(56) References Cited

U.S. PATENT DOCUMENTS

| | | | |
|---|---|---|---|
| 2007/0300220 A1* | 12/2007 | Seliger et al. | 718/1 |
| 2008/0301461 A1* | 12/2008 | Coulier et al. | 713/184 |
| 2009/0260007 A1* | 10/2009 | Beaty et al. | 718/1 |
| 2009/0274303 A1* | 11/2009 | Popp | 380/273 |
| 2009/0300210 A1* | 12/2009 | Ferris | 709/235 |
| 2010/0058342 A1* | 3/2010 | Machida | 718/1 |
| 2010/0242038 A1* | 9/2010 | Berrange et al. | 718/1 |
| 2011/0225417 A1* | 9/2011 | Maharajh et al. | 713/150 |
| 2012/0117565 A1* | 5/2012 | Staelin et al. | 718/1 |

* cited by examiner

SECURE AND AUTOMATED CREDENTIAL INFORMATION TRANSFER MECHANISM

BACKGROUND

The Internet is used to interact with various web sites that offer up-to-date news, reports, real-time information, games, business functions, social interfaces, search functions, telepresence, e-commerce, etc. Behind all of the personal and business applications associated with the Internet is an evolving, rapidly growing, enormous amount of content and information in the form of text, graphics, audio, video, multimedia, data, web objects, applications, real-time streams, and other content capable of internet delivery. All of this content is typically stored on servers, which are basically powerful computers that are specially designed to store and provide or "serve" the requested content to the end users.

However, servers are rather expensive to install, upgrade, and maintain. In addition, the network hardware to connect the servers onto the Internet backbone can also be quite expensive to purchase, install, and maintain. It takes expert knowledge to build and efficiently operate a server farm or data center. Oftentimes, successful businesses may have to upgrade their server infrastructure to handle the increased Internet traffic. The upgrade process can be a difficult, time-consuming, and costly endeavor. Furthermore, running, servicing, troubleshooting, and load-balancing a server farm or data center can be quite daunting. Yet another downside inherent to server farms and data centers is that deployment can take a relatively long period of time. These days, content providers strive to be first-to-market in order to capture a particular audience, market segment, or business opportunity.

In response to the shortcomings of owning and running a dedicated server farm or data center, an Internet based computing technology known as "cloud computing" is gaining popularity. With cloud computing, an information technology (IT) service provider specializes in establishing and running one or more huge collections of servers. The computing, storage, and networking resources of the "cloud computer" are then essentially rented out to businesses and other content providers for a fee. Initially, a user or business can contract for a specific, desired amount of computing, networking, and storage resources in exchange for a specified periodic payment. The IT cloud computing service provider provisions and allocates the requested resources by means of virtualization. In this manner, the actual underlying infrastructure (e.g., servers, network devices, storage units, etc.) is transparent to the purchaser. And should the purchaser need to upgrade, the IT cloud computing service provider can simply provision and allocate the requisite additional amount of resources to handle the purchaser's needs.

Because the cloud computing infrastructure is shared amongst different end users, it is critical that the content and data is kept secure and confidential. It is also critical to keep the sensitive content and data secure from malicious attacks from hackers and other third parties as well. One way to accomplish both these goals entails the use of a symmetric key pair encryption process. One key is the public key, which can be shared publicly; whereas the other key is the private key, which must be kept in a secure local location. This type of encryption provides a very high degree of authentication whenever the cloud computer is being accessed. For example, when a user desires to initiate a command or request through an application programming interface (API) call, the API call is encrypted by means of the public and private keys. This ensures that the API call is authentic.

One problem with this setup is that in order to leverage the capabilities offered by cloud computing, automatically initiated servers should be able to execute an API call to access cloud services such as a distributed queuing service (e.g., Simple Queue Service—SQS). This, in turn, means that the server must have the proper pair of public and private keys to make that API call. However, before the servers are provisioned, they lack the proper pair. Although the public key is supposed to be transmitted and shared, the private key should not. Thus, the problem becomes how to provide the private keys to the servers so that they can execute the necessary API calls.

One solution to the problem is to hardcode the private keys to a read-only machine image. This machine image can then be loaded onto the servers. The disadvantage to this solution is that, should the private key ever become compromised or be periodically renewed for security reasons, it is a rather cumbersome process to have to manually update machine images containing the new private keys. Another possible solution is to transmit the private key as part of the user text data meant to customize the server's state. However, this is very dangerous because the private key is sent in plain text and is susceptible to being intercepted or hacked. A third solution is for a central server to continuously ping the other servers to determine when they are being provisioned. Once a server acknowledges that it is being provisioned, the central server then sends the private key via a secure channel. The downside to this approach is that the central sever has to continuously monitor and track each of the multitudes of servers and their respective states. Turning on many servers at the same time can result in a significant amount of computing overhead. Alternatively, the servers can notify the central server when they are being provisioned. Unfortunately, without an authentication mechanism, the central server may respond to maliciously fabricated notifications and the private key becomes compromised.

Thus, to-date, there is no expedient and fail-safe mechanism for providing credential information transfers in a cloud computing environment.

SUMMARY

Embodiments of the present invention pertain to a mechanism to securely transmit credentials to automatically instantiated virtual machines in a cloud computing environment. The mechanism provides a secure way to transmit the credential information from a central server to one or more of the initiated instances. The central server stores the credential information. It turns on an instantiated instance with a one-time-use secret string sent in the user data. As soon as the instance turns on, it sends a Hypertext Transfer Protocol ("HTTP") request to the central server for the credential information. The secret string is also sent, along with the source instance's unique ID. The central server verifies the secret string and the source instance ID to determine whether the request is authentic. Once the central server validates the authenticity, it invalidates the secret string. The central server then sends credential information over a secure transmission medium. The instantiated instance can now initiate API calls using the credential information to provide the requisite authentication.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

The claimed subject matter is directed to a method and system for securely transmitting credential information to automatically instantiated virtual machines in a cloud computing infrastructure. In one embodiment, this is accomplished by means of two entities. A master server has the credential information and turns on/off other instances based on programmed policies. One or more slaves serve as automatically initiated instances that require the credential information to make API calls. These two entities act in a manner that provides a secure way to transmit the credential information from master to slave in the following steps. Initially, the master turns on a slave with a one-time-use secret string in the user data. As soon as the slave is turned on, it sends a Hypertext Transfer Protocol (HTTP) request to the master for the credential information with the secret string. The slave also includes its instance ID in this request. The instance ID is a unique identifier returned from the cloud computing infrastructure as a return value of a "turn on" signal. Moreover, by sending instance IDs, the master knows when the slaves are being turned on; this eliminates the need for the master to continuously ping or poll the slaves. Upon receipt of the request, the master performs a sanity check by reading the secret string and the instance ID. Once the master validates the authenticity, it invalidates the secret string. The master then sends a separate Secure Sockets Layer (SSL) message that creates a file with the credential information to the designated file in the slave's file system. The root account only has an access to the file. It is assumed that it is secure to transmit the credential information through the SSL connection, and that it is secure to store the credential information within a file that only the root has a read access. Once the file is created, the slave can now start to run its application and make any API calls with the credential file within a secure, authenticated transmission mechanism.

Thus, embodiments of the present invention solve the technical problem of securely transmitting credential information (e.g., Access Key ID and Secret Access Key) to validate user's API calls to its cloud services. Embodiments of the present invention also significantly increase scalability of web services. Moreover, embodiments of the present invention also support the elasticity of cloud computing by issuing API calls in an automated fashion.

Furthermore, embodiments of the present invention solve the problems described above by enabling secure transmission of credential information, such as AMAZON Web Services credential information, to automatically initiated instances. Embodiments of the present invention do not suffer from the complexity and reliability issues of prior art methods and are capable of dealing with on—time secret passwords. In addition, embodiments of the present invention do not require the transmission of secret information through user-data features, which has been proven to be unsecure. Furthermore, embodiments of the present invention do not require the central server to check the remote servers constantly. Finally, embodiments of the present invention are able to provide secure transmission of credential information without the need to hard-code secret information into machine image/read only files.

Figure 1:
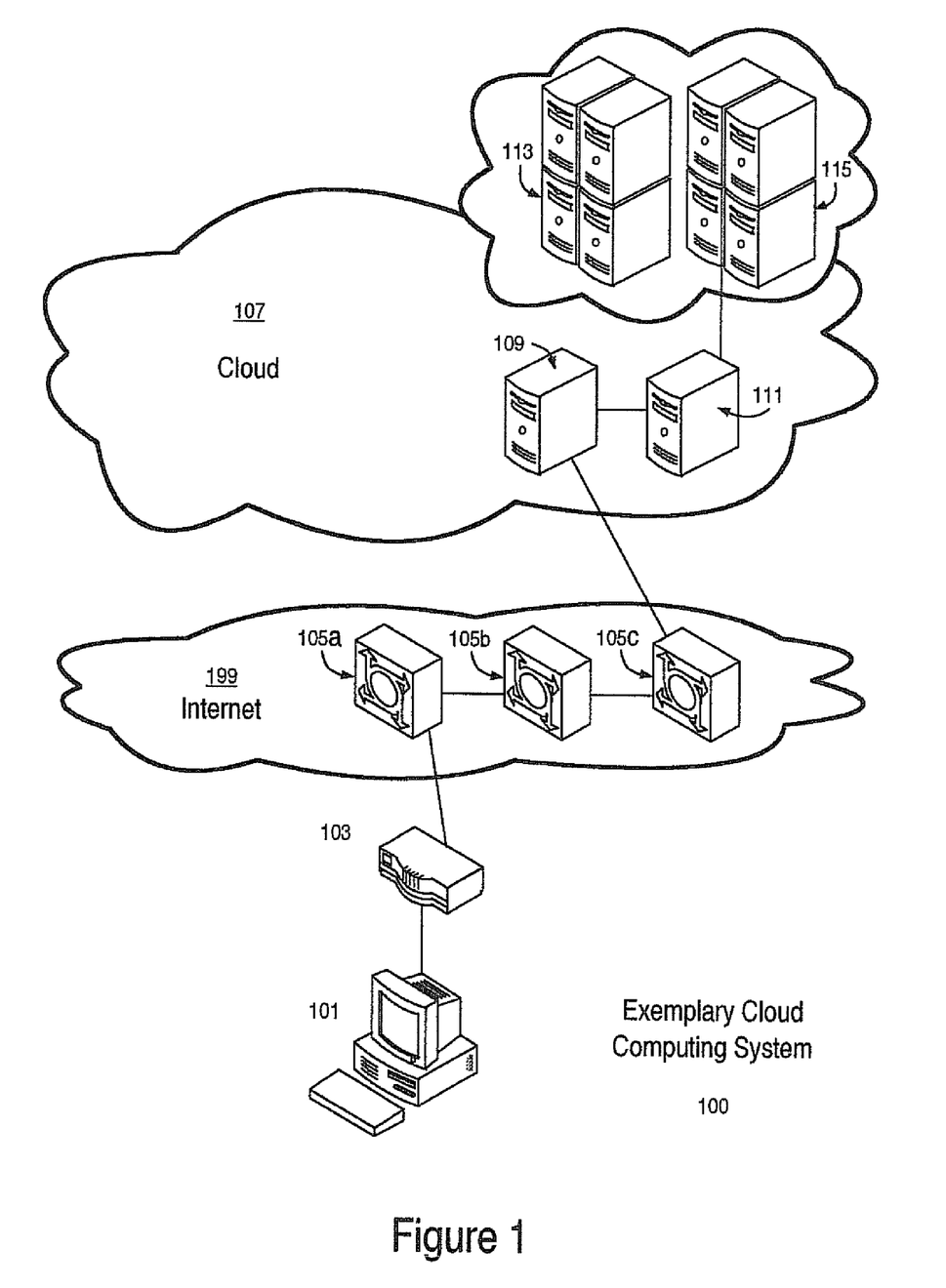
FIG. 1 is a graphical depiction of an exemplary cloud computing environment upon which embodiments of the present invention can be practiced.

With respect to FIG. 1, a graphical depiction 100 of an exemplary cloud computing environment 100 is depicted, in accordance with embodiments of the present invention. According to one embodiment, environment 100 includes a plurality of communicatively interconnected computing environments to each other and/or to the Internet. As presented, environment 100 may include a personal computer 101, a network routing device 103, one or more domain name system (DNS) servers 105a, 105b, 105c, and a plurality of cloud computing components (e.g., hardware servers 109, 111, and virtual machines 113, 115).

As depicted in FIG. 1, a communicative coupling may be established between a personal computer 101 and one or more virtualized instances (e.g., virtual machines 113, 115) of a cloud data center 107. A virtualized instance or virtual machine is an abstraction of computing and/or networking resources, whereby specialized software is run on one or more hardware components such that end users execute programs like a real machine and is unaware of the actual underlying hardware. The same hardware can be shared amongst several virtual machines. In one embodiment, a web application may be hosted on an instance of a virtual machine 113, 115 and accessible through a client-browser executing on a personal computer 101. As depicted, cloud computing environment 107 includes a portion of an exemplary cloud computing data center. This graphical representation may be suitable to represent any organization or arrangement of networked computing devices. In typical embodiments, additional computing resources may be requisitioned and provisioned from the cloud data center dynamically, as needed. Likewise, when resources are over-provisioned, additional computing resources may be relinquished to manage operating costs. Thus, such a graphical representation may represent the infrastructure of a typical cloud data center.

In one embodiment, a personal computer 101 may display content from a web application hosted on a virtualized instance of a web server 113, 115 on a web browser. A user of the personal computer 101 may navigate to a website corresponding to the web application via a uniform resource locator ("URL") web address registered to the web application with one or more DNS servers. As presented, the personal computer 101 may be itself communicatively coupled to a networking device such as a router 103 and further coupled to the Internet 199 through a vast network of interconnected computing devices. In some embodiments, by entering the URL registered to the web application in a web browser, the local Domain Name System ("DNS") server (e.g., DNS server 105a) is queried to resolve the domain name resolution and determine the specific IP address of the requested website. In some instances, the website may not be registered with the local DNS server 105a, and additional DNS servers 105b, 105c may be sequentially queried to determine the address of the web application.

Once the web address has been resolved, the browser is able to communicate with one or more computing resources operated by the web application. In one embodiment, data requests may be received in a computing system operating as a storage host (e.g., storage host 109). According to one embodiment, dynamic content is stored on one or more disparate web servers. The storage host 109 may direct requests directly to the web server (e.g., web server 111). In still further embodiments, the dynamic content is hosted on a plurality of virtual machine instances (e.g., instances 113, 115) hosted on a web server 111. In yet further embodiments, data requests may be received in a proxy web server hosted on the same physical web server 111 as the virtual web server 113, 115 containing the requested data. Additionally, users can execute API calls to issue commands and invoke functions specific to the cloud computer. For example, with API calls, users can upload, access, and/or delete data in the cloud storage. Users can also turn on, configure, and turn off virtual machines through API calls. API calls can also be made to control other scalable web serves. All of these features are crucial parts to cloud computing based applications. However, these API calls to access the various cloud computing services must be authenticated. The present invention provides a high availability, low cost, reliable, and secure mechanism for providing the credential information to the proper virtual machines for authenticating these API calls.

Figure 2:
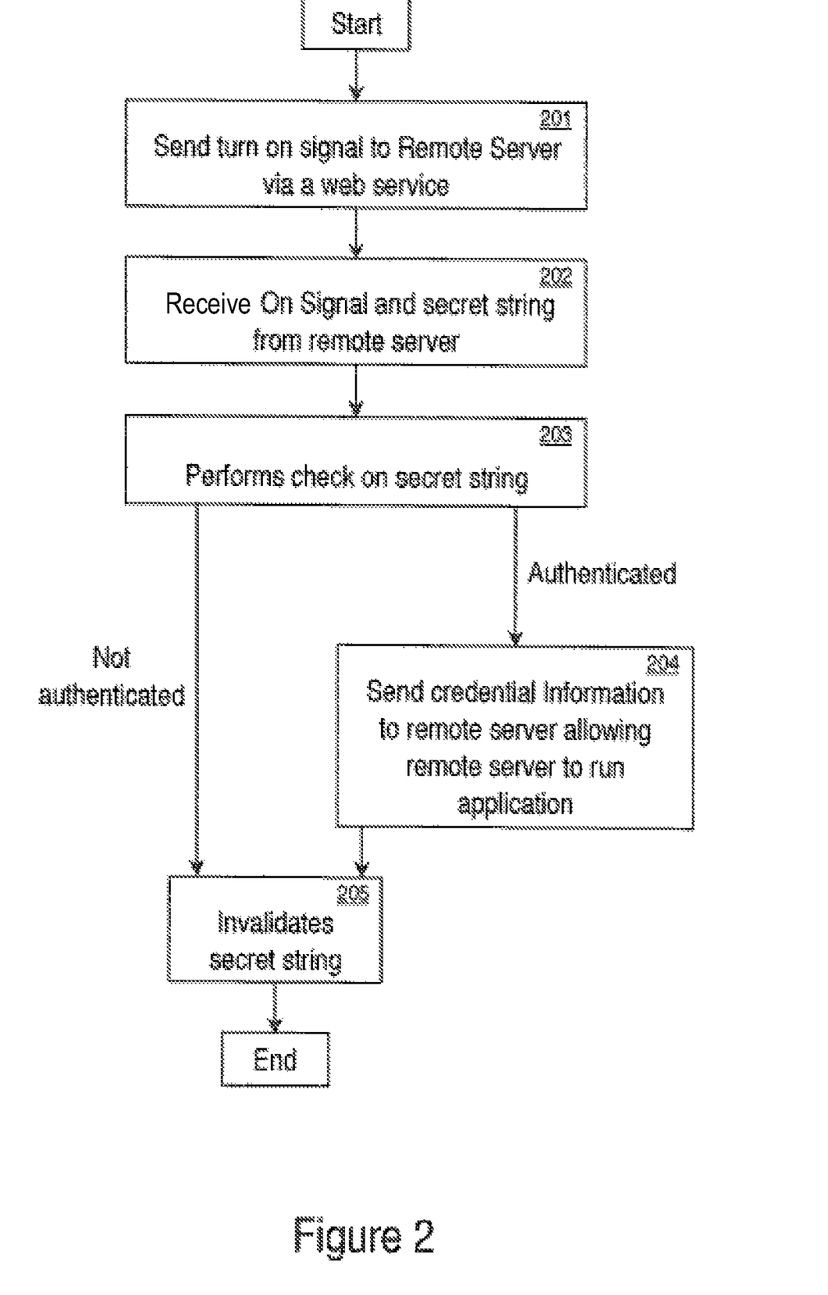
FIG. 2 shows a method for securely transmitting credential information that is in accordance with the present invention.

FIG. 2 displays a method for securely transmitting credential information that is in accordance with the present invention. Before the method begins, it is assumed that it is secure to transmit the credential information through SSL connection. It is also assumed that it is secure to store the credential information within a file that only root has a read access. In step 201, a turn on signal is sent from a central server to a remote server via an infrastructure service within a cloud computing platform. In specific embodiments of the present invention, the infrastructure service, or web service may be a web queue or a web interface. The web queue is a queue that stores messages as they travel between computers. For example, in one embodiment, the web queue may be AMAZON Simple Queue Service (AMAZON SQS). The web service interface is an interface that provides the core database functions of data indexing and querying in the cloud. For example, in one embodiment, the web service interface may be AMAZON SimpleDataBase (AMAZON SDB).

In specific embodiments of the present invention, the central server, as mentioned in step 201, is a server that has the credential information and turns on/off other instances based on programmed policies. In specific embodiments of the present invention, the programmed policies is determined by a user. The central server, or master, may reside within user hardware, or it may reside within the cloud platform. In specific embodiments of the present invention, the central server resides within multiple locations. In specific embodiments of the present invention, there may be several central servers.

In a specific embodiment of the present invention, the remote server, or slave, is an automatically initiated instance that require the credential information to call APIs. In another specific embodiment of the present invention, the remote server is the automatically initiated instances that require the credential information to call APIs. The remote server, or slave, may reside within user hardware, or it may reside within the cloud platform. In specific embodiments of the present invention, the remote server resides within multiple locations. In other specific embodiments of the present invention, there may be multiple remote servers.

In step 202, the central server receives an "on" signal and secret string from the remote server. In specific embodiments of the present invention, the instance ID of the remote server is also received by the central server. The benefit of such an approach is that unnecessary constant checking of remote servers by the central server is prevented because the central server will be alerted by the desired remote server only when the desired remote server is turned on and ready to receive the credential information.

In step 203, the central server performs a sanity check on the secret string received from the remote server. In specific embodiments of the present invention, different secret strings and/or instance IDs could be utilized. Some secret strings and/or instance IDs will not be authenticated and will cause the central server to move on to step 205, while other secret strings and/or instance IDs will be authenticated and will cause the central server to move on to step 204. The benefit of such an approach is that maliciously fabricated "on" signals are filtered out.

In step 204, once the central server authenticates, or verifies the secret string and instance ID to be correct, the central server sends the necessary credential information to the remote server, which allows the remote server to run the desired application. In step 205, the central server invalidates the secret string. In a specific embodiment of the present invention, the secret string is a one-time use string, which is automatically invalidated after one use. In another embodiment of the present invention, step 205, invalidation of the secret string is performed by the central server immediately after the check on the secret string, prior to step 204 of FIG. 2. The benefit of invalidating one-time use string is that maliciously duplicated "on" signals are filtered out.

Figure 3:
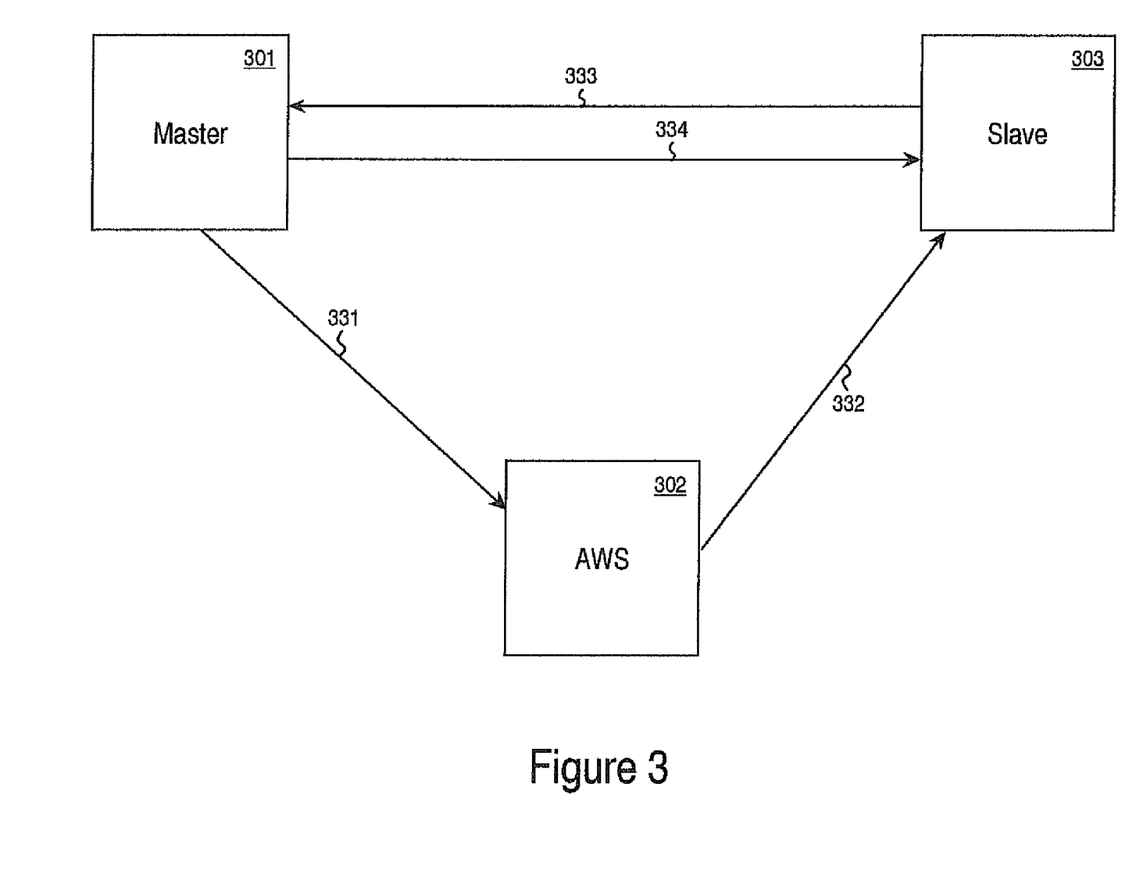
FIG. 3 depicts a system for enabling secure transmission of credential information to automatically initiated instances.

FIG. 3 displays a system for enabling secure transmission of credential information to automatically initiated instances. In this particular system, the cloud computing infrastructure is AMAZON Web Services (AWS). However, the present invention is not limited to AWS; it can be practiced on other types of cloud computing infrastructure, data farms, clustered computing, or any other computing environment whereby computing resources are shared, provisioned, or allocated. In FIG. 3, Master 301 sends a turn on signal 331 to AMAZON Web Services 302. A turn on signal 332 is then sent from AMAZON Web Services 302 to a Slave 303. In specific embodiments, the turn on signals 331 and 332, sent from the Master 301 and AMAZON Web Service 302, respectively, include a secret password. In specific embodiments, the secret password is a one-time use password that is invalidated by the Master 301 after one use. In one embodiment of the present invention, once the Slave 303 receives the turn on signal and the secret password, it sends to Master 301 signal 333 that allows the Master 301 to know that the slave is now turned on. In specific embodiments of the present invention, the signal 333 includes the instance ID of the Slave. In another specific embodiment of the present invention, the signal 333 also includes the secret password that the Master transmitted in signal 331. Once the Master 301 receives the signal 333, it proceeds to verify the instance ID and the secret password contained in the signal. Once the information has been authenticated and verified to be correct, the Master 301 sends a signal 334 to the Slave 303 that contains the credential information (e.g., Access Key ID and/or Secret Access Key). In one instance, the Master 301 may invalidate the secret password before it sends the signal 334 to the Slave 303. In other instances, the Master 301 may invalidate the secret password after it sends the signal 334 to the Slave 303. In one embodiment of the present invention, if the information in signal 333 is not authenticated, then the secret password is destroyed and a signal 334 is not sent to the Slave 303.

Figure 4:
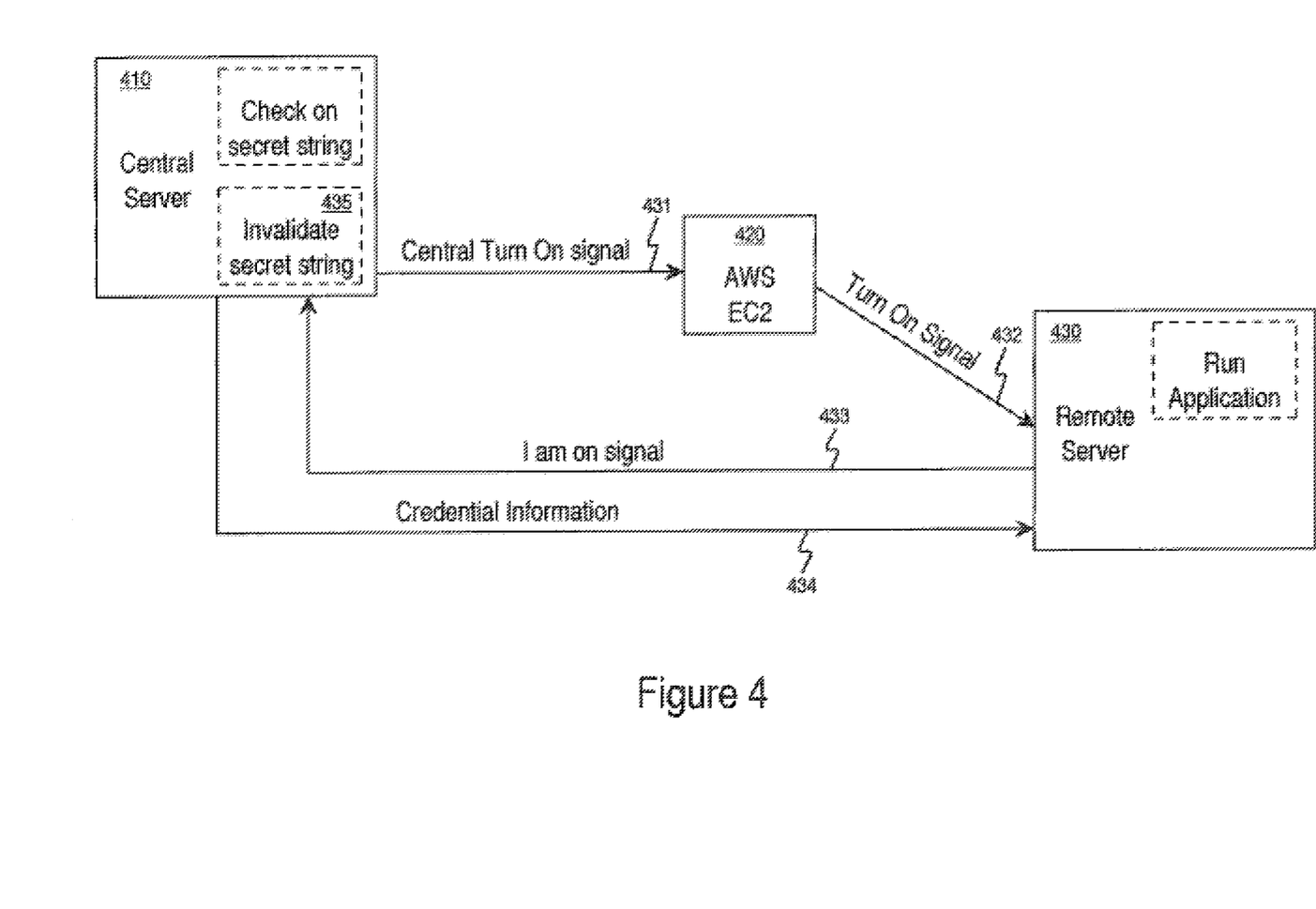
FIG. 4 displays an example of a system to securely transmit credential to automatically instantiated virtual machines in the cloud in accordance with the present invention.

FIG. 4 displays an example of a system to securely transmit credential to automatically instantiated virtual machines in the cloud in accordance with the present invention. In FIG. 4, the Central Server 410 transmits central turn on signal 431 to an Amazon Web Services Elastic Compute Cloud (EC2) 420. The EC2 420 transmits instance turn on to the remote server 430 with user text data 432. The remote server turns on and transmits an "I Am On" Signal 433 to the Central Server 410. The Central Server then performs a check on the secret string and instance ID contained in the signal 433. In one embodiment, as depicted in FIG. 4, the Central Server 410 then sends Credential Information 434 to the Remote Server 430 before it invalidates the secret string 435. In another embodiment, the Central Server 410 will invalidate the secret string 435 before it sends the Credential Information 434 to the Remote Server 430. In some instances, the Central Server 410 may not send Credential Information 434. to Remote Server 430 because the secret string was not authenticated. Once the Remote Server 430 receives the Credential Information Signal 434 from the Central Server 434, the Remote Server 430 utilizes the credential information to run the desired application. In other embodiments, there may be more than one application that the Remote Server 430 runs.

Thus, a mechanism to securely transmit credential information in a secure and efficient manner automatically to initiated instances in a cloud computing environment is disclosed. Although embodiments of the invention have been discussed primarily with respect to specific embodiments thereof, other variations are possible. Various configurations of the described system may be used in place of, or in addition to, the configurations presented herein. For example, although the system was discussed as if its components were serially connected, the components could be linked by a separate data bus or through any number of other configurations. The invention is not limited to use within the infrastructure cloud. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any involving data management. While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims. Furthermore, those skilled in the art will appreciate that the foregoing description is by way of example only, and is not intended to limit the invention.

What is claimed is:

1. A method for transmitting credential information comprising:
    turning on a virtual machine in a cloud computing environment, wherein the cloud computing environment provides computing resources, by transmitting an unrequested particular text string to the virtual machine via an interface provided by the cloud computing environment;
    receiving a request for the credential information from the virtual machine;
    receiving an instance ID from the virtual machine, wherein the instance ID corresponds to the virtual machine;
    determining whether the request contains the particular text string; and
    checking the particular text string against the instance ID from the virtual machine, wherein if the request contains the particular text string and the instance ID corresponds to the virtual machine, the particular text string is invalidated and the credential information is transmitted to the virtual machine in a secure communication channel.

2. The method of claim 1 further comprising:
    transmitting a file with the credential information to the virtual machine, wherein only the virtual machine's root account has access to the file.

3. The method of claim 1 further comprising:
    executing Application Programming Interface ("API") calls with the credential information authenticating the API calls.

4. The method of claim 1, wherein the secure communication channel comprises a Secure Sockets Layer ("SSL") connection.

5. The method of claim 1, wherein the credential information comprises a secret access key.

6. The method of claim 1, wherein the credential information comprises an access key ID.

7. The method of claim 1, wherein the request comprises a Hypertext Transfer Protocol ("HTTP") request.

8. A system for transmitting credential information comprising:
    a server that stores credential information which is used to authenticate API calls and a particular message which is used to confirm requests for the credential information; and
    at least one instantiated instance in a cloud computing environment which is activated by the server with the particular message via an interface provided by the cloud computing environment, the instantiated instance transmitting a request to the server for the credential information, wherein the server transmits the credential information to the instantiated instance in a secure medium once the server verifies the particular message from the instantiated instance and validates the particular message against an instance ID received from the instantiated instance that corresponds to the instantiated instance, and wherein the particular message is unrequested by the instantiated instance.

9. The system of claim 8, wherein the server transmits a file with the credential information to the instantiated instance and only the root account of the instantiated instance has access to the file.

10. The system of claim 8, wherein the server invalidates the particular message after the server validates its authenticity.

11. The system of claim 8, wherein the particular message comprises a secret string in user data.

12. The system of claim 8, wherein the particular message is one-time-use.

13. The system of claim 8, wherein the secure medium comprises an SSL connection.

14. The system of claim 8, wherein the credential information comprises a secret access key.

15. The system of claim 8, wherein the credential information comprises an access key ID.

16. The system of claim 8, wherein the request comprises an HTTP request.

17. A method for securely transmitting secret keys to virtual machines comprising:
- transmitting an unrequested first secret string to a first virtual machine in a cloud computing environment via an interface provided by the cloud computing environment, wherein the cloud computing environment provides computing resources;
- transmitting a second secret string to a second virtual machine in the cloud computing environment via the interface provided by the cloud computing environment;
- receiving a request from the first virtual machine for one of the secret keys;
- receiving a first instance ID from the first virtual machine;
- verifying whether the first virtual machine transmitted the first secret string as part of the request from the first virtual machine and verifying the first secret string against the first instance ID;
- transmitting an appropriate secret key to the first virtual machine if the first secret string and the first instance ID are verified;
- receiving a request from the second virtual machine for one of the secret keys;
- receiving a second instance ID from the second virtual machine;
- verifying whether the second virtual machine transmitted the second secret string as part of the request from the second virtual machine and verifying the second secret string against the second instance ID; and
- transmitting an appropriate secret key to the second virtual machine if the second secret string and the second instance ID are verified.

18. The method of claim 17, wherein the first secret string is transmitted to the first virtual machine when the first virtual machine is provisioned and the second secret string is transmitted to the second virtual machine when the second virtual machine is provisioned.

19. The method of claim 17 further comprising:
- transmitting a first file with the appropriate secret key to the first virtual machine, wherein only the first virtual machine's root account has access to the file; and
- transmitting a second file with the appropriate secret key to the second virtual machine, wherein only the second virtual machine's root account has access to the file.

20. The method of claim 17 further comprising:
- the first virtual machine and the second virtual machine executing API calls with their respective secret keys being used to authenticate their API calls.

21. The method of claim 17, wherein the secret keys are transmitted through a secure communication channel.

22. The method of claim 21, wherein the secure communication channel comprises an SSL connection.

23. The method of claim 17, wherein the request comprises an HTTP request.

24. The method of claim 17 further comprising:
- invalidating the first secret string after the appropriate secret key is transmitted to the first virtual machine; and
- invalidating the second secret string after the appropriate secret key is transmitted to the second virtual machine.

* * * * *